3,018,266
POLYMERIZABLE ELASTOMER-VINYL AROMATIC COMPOUND COMPOSITION CONTAINING A CATALYST PROMOTER SYSTEM AND METHOD OF POLYMERIZING SAME

Lennart A. Lundberg, Stamford, Conn., assignor to American Cyanamid Company, New York, N.Y., a corporation of Maine
No Drawing. Continuation of application Ser. No. 743,482, June 20, 1958. This application July 29, 1960, Ser. No. 46,048
14 Claims. (Cl. 260—45.4)

The present invention relates to elastomer modified vinyl aromatic compositions which are particularly suitable for casting and low pressure laminating applications. More particularly, the present invention relates to a novel catalyst promoter system for compositions of this type.

Compositions of the foregoing type have been prepared in the past. However, heretofore, it has not been possible to cure such compositions at a rate which would permit their practical usefulness by any procedures which make them commercially competitive.

It is an object of the present invention to provide vinyl aromatic elastomer modified compositions which have excellent cure rate. It is another object of the present invention to provide an improved catalyst promoter system for compositions of this type which permits a marked acceleration in cure rates. It is a further object of the invention to provide a commercially attractive material of improved toughness and flexibility which is suitable for molding and laminating applications. Further objects will be apparent from the specification and appended claims set forth hereinbelow.

In general, the present invention is directed to a promoter system for the polymerization of a mixture comprising (A) at least 75% of a vinyl aromatic compound, (B) at least 5% of an elastomer and (C) at least 1% of a cross-linking agent.

Compositions of the foregoing type are disclosed in U.S. Patent 2,609,353. Such compositions have excellent mechanical properties and are potentially economical. In the past, however, these materials have not received acceptance generally due to the long cure cycles required in the use thereof. In order to complete economically with other materials such as polyester resins, for example, it is necessary that the composition be capable of being fully cured in reasonably short cure cycles of the order of 15 minutes and preferably in substantially less time. Lengthy cure cycles are not only costly, but lead also to a loss of monomer (blowing) in those cases where the cure is not sufficiently rapid to tie up the monomer by the time the mold press is open. When this occurs, a rough, irregular and generally unsatisfactory product results. Attempts have been made to alleviate this difficulty by postcure operation, but such techniques are generally unsatisfactory and in addition involve a significant cost increase.

According to the invention, I have discovered that excellent cure rates of the elastomer-resin composition may be obtained by using a promoter system as an aid to the catalyst to accelerate the reaction. Such promoters comprise essentially a compound having the basic imino group

The use of such compounds alone or in combination with a copper salt as promoters provide a highly desirable and practical curing cycle. In a general way, the invention thus concerns the rapid curing of a composition comprising (A) a vinyl aromatic compound in amounts of from 75 to 94%, (B) an elastomeric compound in amounts of from about 5 to 15%, (C) from 1 to about 10% of a cross-linking agent, by means of (D) a polymerization catalyst and (E) a polymerization promoter.

The vinyl aromatic compound (A) contemplated by the present invention is of the type represented by the general formula:

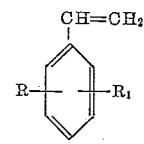

wherein R and $R_1$ are substituents selected from the group consisting of hydrogen and methyl and ethyl radicals. Examples of such compounds are styrene per se, methylstyrene, including ortho-methyl-styrene, meta-methylstyrene and para-methylstyrene, dimethylstyrene, ethylvinyl benzene, diethylvinyl benzene and the like or mixtures of any two or more of such compounds or mixtures thereof with acrylonitrile.

The rubbery elastomer (B) employed in our invention may be any of the well-known rubbery compounds, either natural or synthetic, many of which are available commercially both in solid form or as latices. In general, these elastomers comprise polymers and copolymers derived from diolefin compounds, such as butadiene-1,3; isoprene; 2,3-dimethylbutadiene-1,3; 1,4-dimethylbutadiene-1,3; piperylene; hepadiene-1,3; 2-methyl pentadiene-1,5; 2-methyl-3-butyl butadiene-1,3; 2,3-diethylbutadiene; and the like. The rubbery elastomeric compound (B) may consist entirely of a natural rubber or a synthetic rubbery diolefin, i.e. a homopolymer, although the diolefin rubbery polymer preferably contains a minor proportion, i.e. from about 5% to about 40% of an olefinic modifying compound, such as those of the general formula above, e.g. styrene, vinyl toluene, etc. or an acrylate or pyridine, for example. The rubbery elastomers thus include such compounds as styrene-butadiene and butadiene-acrylonitrile rubbers, neoprene rubber, butyl rubber, silicone rubber, polyacrylate rubber, pyridine-butadiene rubbers and chlorosulfonated polyethylene, for example. The styrene-butadiene synthetic rubbers generally contain about 75% butadiene and about 25% styrene and the nitrile-butadiene rubbers about 15% to about 35% acrylonitrile, the remainder being butadiene. The composition of these rubbers, styrene-butadiene and acrylonitrile-butadiene, referred to as SBR and NBR rubbers, respectively, (see ASTM designation: D 1418—56T, June 1956) however, is not restricted to the above proportions.

The amount of the elastic rubbery component employed in the present invention may vary from about 5 to about 20% by weight, based on the total weight of the composition, but is preferably employed in amounts of from about 8 to 13% by weight.

In addition to imparting improved impact strength and toughness to the molded polymer, the elastomer functions to provide the polymerizable material with the desired viscosity to permit its practical use in the molding operation.

Suitable cross-linking agents, (C) which function primarily to provide the requisite gel structure for the polymerizing composition may be any of the compounds containing two ethylenically unsaturated radicals, the unsaturated double bonds of which are not directly conjugated, i.e. nonconjugated bivinyl polymerizable compounds. Excluded, for example, is 1,3-butadiene. Illustrative examples of suitable compounds are such as methylene-bis-acrylamide, divinyl benzene, diallyl ether, glycol diacrylate, and various allyl esters of dibasic acids such as diallyl phthalate, allyl acrylate, dia'lyl succinate, diallyl maleate, diallyl carbonate, and the like. In addition to imparting the necessary molecular structure, such agents also act to raise the heat distortion temperature of the molded product. In general, at least 1% and up to about 20% by weight and preferably from about 3% to about 9% of the cross-linking agent is employed.

In the selection of a catalyst, any one of the well-known organic hydroperoxide catalysts may be employed. The amount of such catalysts may vary over rather wide limits. Thus, from about 0.1% to about 10% by weight, based on the total weight of the polymerizable composition, i.e. the total weight of (A), (B) and (C) may be used. Preferably, from about 0.2 to about 2% by weight of the catalyst based on the total weight of the polymerizable composition gives the desired results. A faster rate of cure usually results from increasing the catalyst content within the aforementioned limits. A few examples of suitable peroxide catalysts are cumene hydroperoxide, tertiary butyl hydroperoxide, toluyl hydroperoxide, p-bromo-benzoyl hydroperoxide, p-menthane hydroperoxide, pinane hydroperoxide, diisopropylbenzene hydroperoxide, 1-cyclohexanol-1-hydroperoxide, and the like. In addition to the organic hydroperoxides, organic peroxides such as benzoyl peroxide, succinyl peroxide, acetyl peroxide, methyl ethyl ketone peroxide, ditertiary butyl peroxide, anisoyl peroxide, furoyl peroxide, and the like may be employed with the hydroperoxides, but their presence is not essential.

As the promoter system for the catalyst, a large number of substances having the amidino component or a quaternary ammonium salt may be employed. In connection with the former compounds, one or more compounds boiling above about 60° C. and containing a basic

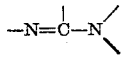

group or tautomers thereof or acid salts of either may be used. These amidines or guanyl compounds may be either unsubstituted or substituted with a wide variety of aromatic, aliphatic or cyclo-aliphatic radicals. While this ingredient of the promoter combination may be employed without modification, it is often desirable to utilize the acid salt form of the amidine compound because basic compounds are apt to reduce or destroy the ultraviolet light absorbing power of certain hydroxylated benzophenones. Many different organic and inorganic acids are suitable for preparing these amidino salts. For example, hydrochloric, hydrobromic, sulfuric, nitric, phosphoric, carbonic, acetic, benzoic, carbolic, formic, fumaric, maleic, oxalic, succinic and the like acids may be employed in preparing such salts.

Examples of organic compounds and the salts thereof containing the basic

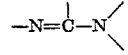

group which may be employed in the resinous compositions of the invention are the guanidines, e.g. dicyclohexyl guanidine, 1,2-diphenyl guanidine, diphenyl-p-tolylguanidine hydrochloride, di-o-tolylguanidine, 1,3-guanidine, dodecylguanidine, 1,3-bis(2-chloro-4-methoxyphenyl) guanidine hydrobromide, guanidine hydrochloride, ethylene guanidine hydrochloride, 1,1'-(ethylene di-p-phenylene) diguanidine hydrochloride, 1-ethyl-2,3,4-triphenylguanidine hydrochloride, p-hydroxybenzyl guanidine, methoxyguanidine sulfate, N,N-dicyclohexylguanidine, butyldicyclohexyl guanidine bicarbonate, octylguanidine nitrate; the isomelamines, e.g. 1,3,5-tribenzylisomelamines, triphenylisomelamines, the amidines, e.g. acetamidine, benzamidine, laurylamidine hydrochloride, dodecylamidine hydrochloride, acetamidine hydrochloride, the biguanides, e.g. phenylbiguanide hydrochloride, isopropylbiguanide hydrochloride, 1,1-bis(2-hydroxyethyl)-3,5-bis(3-methoxypropyl)-guanidide acetate, 1-(p-bromophenyl)-biguanide hydrochloride, p-chlorophenyl biguanide; the biguanidines, e.g. (3-dibenzofuryl) methylbiguanidine, 1-(p-iodophenyl( biguanidine hydrochloride, (p-methoxyphenyl) sulfanilylbiguanidine, o-tolylbiguanidine, 1-(p-chlorophenyl)-5-isopropylbiguanidine, 1-(2-dibenzofuryl) biguanidine, phenylbiguanidine hydrochloride, isopropylbiguanidine hydrochloride; the guanylureas, e.g. guanyl-(phenylsulfonyl)guanylurea, 1-guanyl-2-thioguanylurea carbonate, heptylguanylurea, 1-hexyl-1-methylguanylurea, (2-hydroxyethyl) guanylurea, 1-(alpha-hydroxybutyryl) guanylurea; the pseudoureas, or isoureas and their tautomers, e.g. 2-(71chloro-4-methyl-2-guinolyl)-2-thiopseudourea hydrochloride, 2-p-cyanobenzyl-2-thiopseudourea hydrochloride, 2-cyclohexylpseudourea, 2-decylpseudourea, ethylpseudourea, 2-dodecylpseudourea hydrochloride, 2-(dodecyloxymethyl)-2-thiopseudothiourea hydrochloride, laurylpseudourea hydrochloride, dimethylallyl pseudourea; the pseudothioureas and their tautomers, e.g. ethylpseudothiourea and the ethylpseudothiourea bydrobromides; and the like.

The quaternary ammonium salts are those described in U.S. Patent 2,593,787 as quaternary ammonium salts of a nonoxidizing acid at least as strong as acetic acid. Suitable compounds of this group include tetramethyl ammonium chloride, trimethyl benzyl ammonium chloride, trimethyl benzyl ammonium bromide, triethyl benzyl ammonium chloride, phenyl trimethyl benzyl ammonium chloride, lauroyl pyridinium chloride, ethyl pyridinium chloride, trimethyl benzyl ammonium acetate, benzyl trimethyl ammonium acetate, benzyl trimethyl ammonium iodide, trimethyl benzyl ammonium malate, trimethyl benzyl ammonium oxalate, benzyl trimethyl ammonium phosphate, and the like.

Based on the content of active material, that is, omitting the weight of any acid component, the amidine or quaternary ammonium compound desirably amounts to between about 0.005 and about 0.5% of the total weight of elastomer thickened composition, namely the total weight of (A), (B) and (C), 0.01 to 0.1% being preferred for most purposes. While larger quantities may often be utilized, increasing the concentration of this component beyond the stated range impairs the accelerating effect of the promoter combination in some cases. According to the invention, the above compounds may, and in keeping with the preferred aspects of the invention, are employed in combination with a dissolved copper salt as the promoter system. The amount of dissolved copper may be present in amounts varying within a fairly wide range. Generally, amounts of from 0.001 to about 10 parts by weight per million, based on the total composition, may be used. Such copper compounds may be either organic or an inorganic salt and may be in either the cuprous or the cupric state. Examples of such compounds are cupric acetate, cupric arsenate, cupric benzoate, cupric carbonate, cupric chloride, cupric fluoride, cupric oleate, cupric sulfate, cuprous bromide, cuprous carbonate, cuprous chloride, cuprous iodide, cuprous sulfate, copper naphthenate, copper pelargonate and the like.

The promoter system may be in addition employed in combination with a minor amount, within the range of from 1% to 10% by weight based on the total weight of the composition of (A), (B) and (C), of (F) an unsaturated polyester resin either modified or unmodified. Polyester resins of this type comprise an unsaturated linear polyester derived from a polyhydric alcohol and an olefinic or ethylene unsaturated polycarboxylic acid. Among the many suitable polyhydric alcohols are ethylene glycol, diethylene glycol, propylene glycol dipropylene glycol, trimethylene glycol, tetramethyene glycol, pinacol, arabitol, xylitol, dulcitol, adonitol, mannitol, glycerol, trimethylol propane, trimethylol ethane, sorbitol, 1,1'-isopropylidine bis(p-phenylenoxy)di-2-propanol, pentaerythritol, dipentaerythritol, and alkanediols as exemplified by butanediol-1,2, butanediol-1,3, butanediol-1,4, pentanediol-1,2, pentanediol-1,4, pentanediol-1,5, hexanediol-1,6 and the like. It is usually desirable that a dihydric alcohol be employed in major proportion relative to any alcohols containing more than two hydroxy groups which may be used in forming the polyester. In lieu of the polyester, a small amount of polyacrylonitrile, i.e. about 1 to 7.5%, based on the total weight of the composition, namely, (A), (B) and (C) produces good, although somewhat less superior results.

The other reactant with the polyhydric alcohol in forming the present unsaturated alkyds is a polycarboxylic acid. The expressions "polycarboxylic acids" and "dicarboxylic acids" are used herein in their broader sense to include available similarly reacting anhydrides such as maleic and phthalic anhydrides. Among the suitable alpha, beta-ethylenically unsaturated acids are maleic, fumaric, aconitic, itaconic, citraconic, mesaconic, chloromaleic, carbic, etc., aids and mixtures thereof. Substantial amounts of polycarboxylic acids which are free of nonbenzenoid unsaturation may also be used, but the unsaturated acids should be present in an amount approximating at least 5% by weight of the total weight of the polycarboxylic acids used. Frequently, the olefinic or ethylenically unsaturated acids amount to between about 25% and 65% by weight on the same basis. Examples of polycarboxylic acids which are free of non-benzenoid unsaturation include phthalic, oxalic, malonic, succinic, glutaric, sebacic, adipic, pimelic, suberic, azelaic, tricarballylic, citric, tartaric and malic acids, and mixtures thereof.

It is advantageous to add a moderate amount of an inhibiting agent to the composition to impart improved storage stability to the uncatalyzed mixture. Examples of inhibiting agents that may be used in my invention are such as hydroquinone, ditertiary butyl hydroquinone, pyrogallol, tannic acid, tertiary butyl catechol, di-tert-butyl p-cresol or an organic amine such as aniline or phenylene diamine. Mixtures of the inhibiting agents may also be used if desired. About 0.004% to about 0.02% of inhibiting agent by weight, based on the total weight of the resinous composition, namely, (A), (B) and (C) usually gives satisfactory results.

Curing of the new liquid resin compositions may be accomplished with or without added pressure, in the atmosphere or in closed molds, at temperatures ranging from about 100° C. up to 150° C. and higher, as long as the temperatures are kept below the point at which resin degradation commences.

The novel cured resins processed according to the invention possess the excellent qualities, both mechanical and chemical, associated with polyester resins. During the curing cycle, no gases are evolved when the polymerization reaction is conducted at moderate temperatures (60° C.–80° C.) or in a closed mold. Since translucent light-colored products are obtainable, they may be dyed or pigmented in a limitless variety of shades and hues. In view of their good physical properties, the new resinous compositions have broad utility in many fields, including uses as coating and film forming materials, adhesives, binding agents, impregnating agents, molding compositions, laminating and casting resins, and in reinforced plastic articles such as corrugated and flat structural panels.

For a better understanding of the nature and objects of this invention, reference should be had to the accompanying illustrative examples wherein all proportions are expressed in terms of weight unless otherwise stated therein.

The gel characteristics and "time to 100° C." which are employed as a test to ascertain suitable cure rates in the examples are determined on samples by the following procedure: 100 g. of resin are tared into a 200 ml. tall form beaker. The stipulated amounts of catalyst and promoter are added and the beaker is immersed into a hot water bath held at 80±0.1° C. The resin is agitated for the first 15 seconds of each minute by means of a stirring rod. The time is recorded when the resin gels (by observation to a stringy gelatinous condition). A thermometer is placed into the resin and held upright in the center with the thermometer resting on the bottom of the beaker. The time to reach 100° C. is recorded. The temperature rises rapidly thereafter climbing above 200° C. and completing the curing cycle within 2 to 5 minutes after the temperature of the reaction initially attains 100 °C.

EXAMPLES 1–12

Examples 1–12, each having a formulation comprising: (A) 80 parts of styrene; (B) 12 parts of SBR rubber (76.5% butadiene-23.5% styrene); (C) 8 parts of divinyl benzene, (D) 1%, based on the total composition weight of (A), (B) and (C), of cumene hydroperoxide and 0.5%, based on the total composition weight of (A), (B) and (C), of Luperco ATC (50% benzoyl peroxide-50% tricresyl phosphate) are treated according to the following procedure. Each of the ingredients are introduced into a suitable reaction vessel equipped with stirrer and external heating so that a temperature of 80° C. is maintained in the reaction vessel. The mixture is stirred for the first 15 seconds of each minute. The resulting cure cycles obtained through the use of various promoters employed for the purpose of accelerating the reaction of the above composition alone and in combination with small amounts of polyester are set forth in Table I, together with controls (Examples 6, 7 and 15) in which no promoter is utilized.

Table I

| 0.5% Promoter [1] | No Polyester Resin | | | 5% Polyester Resin [3] | | |
|---|---|---|---|---|---|---|
| | Example | Gel Time | Time to 100° C. | Example | Gel Time | Time to 100° C.[2] |
| None | | | | 7 | 15–16 | 40'30'' |
| Benzamidine HCl | 1 | 24' | 36' | 8 | 9' | 17'10'' |
| Benzamidine HCl+40 p.p.m. copper | 2 | 13' | 18'20'' | 9 | 7' | 12'25'' |
| Benzamidine HCl+100 p.p.m. copper | 3 | 11' | 14'55'' | 10 | 5' | 8'15'' |
| Ethylene guanidine HCl | 4 | 31' | 61' | 11 | 12' | 23'20'' |
| Ethylene guanidine HCl+40 p.p.m. copper | 5 | 26' | 61' | 12 | 7' | 12'50'' |
| Tetramethylammonium chloride | | | | 13 | 10' | 18'30'' |
| Tretramethylammonium chloride+80 p.p.m. copper | | | | 14 | 9' | 13'35'' |
| Control [4] | 6 | 29–30' | 45'35'' | 15 | 16–17 | 28'35'' |

[1] 10% solution of active ingredient in diethylene glycol.
[2] Run above 200° C. within 2–5' after reaching 100° C.
[3] Propylene glycol maleate.
[4] Control with 2% Lupercol ATC (50% benzoyl peroxide-50% tricresyl phosphate).

EXAMPLES 16–23

The procedure of Examples 1–15 is repeated with a formulation comprising 6 parts of SBR rubber, 6 parts of divinylbenzene, 88 parts of styrene and 3%, based on the weight of the total composition, of an unsaturated polyester alkyd.

The above* are polymerized in the presence of promoters and with resulting cure cycles as set forth in Table II.

*Table II*

| Example | Catalyst | Percent | Promoter | Active Ingredient, Percent | Gel Time | Time to 100° C. |
|---|---|---|---|---|---|---|
| 16 | Lupercol ATC [1] | 1 | None | | 32'00 | 49' |
| 17 | ---do [1] | 2 | ---do | | 22'30'' | 35'25'' |
| 18 | ---do [1] | 1 | Dodecyl mercaptan [2] | 0.05 | 33'15'' | 50-55' |
| 19 | ---do [1] | 2 | ---do [2] | 0.05 | 20'45'' | 31'30'' |
| 20 | ---do [1] | 1 | Diethyl aniline | 0.05 | 23'00 | |
| 21 | ---do [1] | | | 1.0 | 18'00 | 34'00'' |
| 22 | ---do [1] | 0.5 | Benzamidine HCl [3] | 0.5 | 9'15'' | 15'30'' |
| 23 | CHP | 1.0 | ---do [3] | 0.1 | 10'00 | 19'00 |

[1] 50% benzoyl peroxide—50% tricresyl phosphate.
[2] 10% solution in styrene.
[3] Benzamidine hydrochloride (10% solution in diethylene glycol).

In the curing of polyester resins, certain promoters are commonly used with benzoyl peroxide to speed up the polymerization rate of unsaturated polyester resins. Two of the most commonly used promoters used for this purpose are diethyl aniline and dodecyl mercaptan. As seen by reference to Table II, these promoters are practically ineffective in promoting the polymerization rate of a typical elastomer-styrene-alkyd composition.

The use of methylene-bis-acrylamide imparts an unusually pleasing glossy surface to the cured resin. The effect is illustrated by the Examples 24 and 25, in which the resinous composition is used in the fabrication of 3-ply laminated sheets containing glass mat. The glossy appearance is found unique with the methylene bisacrylamide cross-linking agent. Even when the cure time is extended to 30 minutes in Example 24, a glossy effect is not obtained.

EXAMPLE 24

Formulation:
SBR (76.5% butadiene — 23.5% styrene), parts _____ 12
Styrene, parts _____ 80
Divinylbenzene, parts _____ 8
Polyester,[1] percent _____ 5
Catalyst—1% cumene hydroperoxide, percent __ 0.5
ATC (50% benzoyl peroxide—50% tricresyl phosphate) Promoter—(10% solution of a benzamide hydrochloride in diethylene glycol containing 100 p.p.m. copper), percent _____ 0.5

[1] 5% based on the total weight of the composition. Same polyester described in Examples 16–23.

Cure: Barcol hardness
15' at 150° C. ____ 20–35 smooth but dull surface.
30' at 150° C. ____ 20–35 smooth but dull surface.

EXAMPLE 25

The same procedure and formulation as in Example 24 are employed, with the exception that the divinylbenzene cross-linking agent is replaced with an equal amount of methylene-bis-acrylamide.

Cure: Barcol hardness
15' at 150° C. _____ 20–35 smooth glossy surface.

EXAMPLE 26

The procedure employed in Examples 1–15 is repeated with the following formulation:

NBR (90% butadiene—10% acrylonitrile), parts __ 8
Methylstyrene, parts _____ 64
Acrylonitrile, parts _____ 20
Divinylbenzene, parts _____ 8
Polyester alkyd (propylene glycol maleate), percent _____ 5
Tertiary butyl hydroperoxide, percent _____ 1.5
Trimethyl benzyl ammonium bromide (10% solution in diethylene glycol containing 75 p.p.m. copper), percent _____ 0.75

* A polyester resin derived from the reaction of 6.6 moles of propylene glycol, 2 moles of phthalic anhydride and 4 moles of maleic anhydride by heating the mixture at a temperature of 190° C. under an atmosphere of oxygen until the acid number drops to 35–40.

The composition has the following cure data: gel time—7.5 minutes; time to 100° C.—11 minutes and 45 seconds.

EXAMPLE 27

Two 12-ply, glass reinforced laminates (181–136 type glass cloth) were prepared from the same resin composition used in Example 24. The first of these laminates was prepared using 3% Luperco ATC (50% benzoyl peroxide—50% tricresyl phosphate) as the catalyst with no promoter, while the second laminate was catalyzed with 2% cumene hydroperoxide and 1% Luperco ATC, using 0.5% of a 10% solution of benzamidine hydrochloride in diethylene glycol as promoter for the catalyst. Both laminates were cured 15 minutes at 300° F. and under 15 p.s.i. pressure. The first laminate, containing no promoter for the catalyst, was found to be only partially cured (surface hardness by Barcol tester was only 10–20) whereas the second laminate, having a Barcol hardness of 50–60, cured completely. As indicated by a Barcol surface hardness, it is apparent that a much longer cure cycle is necessary using straight peroxide type catalyst to effect cure. The laminates described in this example were found to have resin contents of 33.0 and 33.1%, respectively.

EXAMPLE 28

A stable premix molding compound suitable for direct compression molding operations is prepared from the same resin composition as described in Example 24. 30 parts of this resin are mixed with 20 parts of glass fiber (½'' chopped glass), 50 parts of clay (ASP #100) and 1 part of magnesium stearate as lubricant using a sigma arm mechanical mixer. A fairly dry molding composition is obtained upon mixing 5–8 minutes. Samples are molded into 4''-diameter disks under a pressure of 2000 p.s.i. Cure cycles of 3, 4 and 5 minutes at 300° F. gave rise to smooth, glossy and tough opaque disks having Barcol surface hardnesses of 27–36, 36–43 and 42–44, respectively. No further increase in hardness resulted up increasing the cure cycle to 10 minutes.

While there are above disclosed only a limited number of the embodiments of the compositions and process of the invention herein presented, it is possible to produce still other embodiments without departing from the inventive concept herein disclosed, and it is desired, therefore, that only such limitations be imposed on the appended claims as are stated therein or required by the prior art.

This application is a continuation of my earlier application having the Serial Number 743,482 filed June 20, 1958, entitled "Catalyst-Promoter System for Polymerizable Elastomer-Styrene Composition," now abandoned.

I claim:
1. A polymerizable composition comprising (A) from 75% to 94% by weight of a polymerizable compound having the formula:

wherein R and R₁ are substituents selected from the group consisting of hydrogen and methyl and ethyl radicals, (B) from 5% to 20% by weight of a rubbery elastomer selected from the group consisting of natural rubber and a synthetic rubbery polymer of a conjugated diolefin, (C) from 1% to 15% by weight of a non-conjugated bivinyl polymerizable cross-linking agent, (D) from about 0.1% to 5% by weight of a peroxide polymerization catalyst and (E) from about 0.005% to about 0.5% by weight of a catalyst promoter selected from the group consisting of (i) a compound selected from the group consisting of isomelamines, amidines, and salts thereof, (ii) a quaternary ammonium salt of a non-oxidizing acid at least as strong as acetic acid and (iii) mixtures of a member selected from the group consisting of (i) and (ii) with a copper salt containing copper in amounts of from about 0.001 to about 10 parts by weight per million based on the total weight of the composition wherein the percentages of each of (D) and (E) is based on the total weight of (A), (B) and (C).

2. A polymerizable composition comprising (A) from 75% to 94% by weight of a polymerizable compound having the formula:

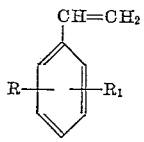

wherein R and R₁ are substituents selected from the group consisting of hydrogen and methyl and ethyl radicals, (B) from 5% to 20% by weight of a styrene-butadiene copolymer elastomer, (C) from 1% to 15% by weight of a non-conjugated bivinyl polymerizable cross-linking agent, (D) from about 0.1% to 5% by weight of a peroxide polymerization catalyst and (E) from about 0.005% to about 0.5% by weight of a catalyst promoter selected from the group consisting of (i) a compound selected from the group consisting of isomelamines, amidines, and sales thereof, (ii) a quaternary ammonium salt of a non-oxidizing acid at least as strong as acetic acid and (iii) mixtures of a member selected from the group consisting of (i) and (ii) with a copper salt containing copper in amounts of from about 0.001 to about 10 parts by weight per million based on the total weight of the composition wherein the percentages of each of (D) and (E) is based on the total weight of (A), (B) and (C).

3. A polymerizable composition comprising (A) from 75% to 94% by weight of a polymerizable compound having the formula:

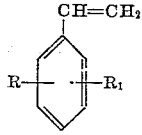

wherein R and R₁ are substituents selected from the group consisting of hydrogen and methyl and ethyl radicals, (B) from 5% to 20% by weight of a rubbery elastomer selected from the group consisting of natural rubber and a synthetic rubbery polymer of a conjugated diolefin, (C) from 1% to 15% by weight of a non-conjugated bivinyl polymerizable cross-linking agent, (D) from about 0.1% to 5% by weight of a peroxide polymerization catalyst, (E) from about 0.005% to about 0.5% by weight of a catalyst promoter selected from the group consisting of (i) a compound selected from the group consisting of isomelamines, amidines, and salts thereof, (ii) a quaternary ammonium salt of a non-oxidizing acid at least as strong as acetic acid and (iii) mixtures of a member selected from the group consisting of (i) and (ii) with a copper salt containing copper in amounts of from about 0.001 to about 10 parts by weight per million based on the total weight of the composition and (F) from 1% to 10% by weight of an unsaturated linear polyester resin prepared by reacting a polyhydric alcohol and an alpha, beta-ethylenically unsaturated dicarboxylic acid wherein the percentages of each of (D), (E) and (F) is based on the total weight of (A), (B) and (C).

4. A polymerizable composition comprising (A) from 75% to 94% by weight of a polymerizable compound having the formula:

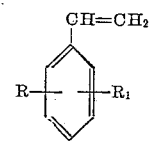

wherein R and R₁ are substituents selected from the group consisting of hydrogen and methyl and ethyl radicals, (B) from 5% to 20% by weight of a styrene-butadiene copolymer elastomer, (C) from 1% to 15% by weight of a non-conjugated bivinyl polymerization cross-linking agent, (D) from about 0.1% to 5% by weight of a peroxide polymerization catalyst, (E) from about 0.005% to about 0.5% by weight of a catalyst promoter selected from the group consisting of (i) a compound selected from the group consisting of isomelamines, amidines, and salts thereof, (ii) a quaternary ammonium salt of a non-oxidizing acid at least as strong as acetic acid and (iii) mixtures of a member selected from the group consisting of (i) and (ii) with a copper salt containing copper in amounts of from about 0.001 to about 10 parts by weight per million based on the total weight of the composition and (F) from 1% to 10% by weight of an unsaturated linear polyester resin prepared by reacting a polyhydric alcohol and an alpha, beta-ethylenically unsaturated dicarboxylic acid wherein the percentages of each of (D), (E) and (F) is based on the total weight of (A), (B) and (C).

5. A polymerizable composition comprising (A) from 75% to 94% by weight of a polymerizable ring substituted methylstyrene, (B) from 5% to 20% by weight of a styrene-butadiene copolymer elastomer, (C) from 1% to 15% by weight of methylene bis acrylamide, (D) from about 0.1% to 5% by weight of a peroxide polymerization catalyst, (E) from about 0.005% to about 0.5% by weight of a catalyst promoter selected from the group consisting of (i) a compound selected from the group consisting of isomelamines, amidines, and salts thereof, (ii) a quaternary ammonium salt of a non-oxidizing acid at least as strong as acetic acid and (iii) mixtures of a member selected from the group consisting of (i) and (ii) with a copper salt containing copper in amounts of from about 0.001 to about 10 parts by weight per million based on the total weight of the composition and (F) from 1% to 10% by weight of an unsaturated linear polyester resin prepared by reacting a polyhydric alcohol and an alpha, beta-ethylenically unsaturated dicarboxylic acid wherein the percentages of each of (D), (E) and (F) is based on the total weight of (A), (B) and (C).

6. A polymerizable composition comprising (A) from 75% to 94% by weight of a polymerizable ring substituted methylstyrene, (B) from 5% to 20% by weight of an acrylonitrile-butadiene copolymer elastomer, (C) from 1% to 15% by weight of methylene bis acrylamide, (D) from about 0.1% to 5% by weight of a peroxide polymerization catalyst, (E) from about 0.005% to about 0.5% by weight of a catalyst promoter selected from the group consisting of (i) a compound selected from the group consisting of isomelamines, amidines, and salts thereof, (ii) a quaternary ammonium salt of a non-oxidizing acid at least as strong as acetic acid and (iii) mixtures of a member selected from the group consisting of (i) and (ii) with a copper salt containing copper in amounts of from about 0.001 to about 10 parts by weight per million based on the total weight of the composition and (F) from 1% to 10% by weight of an unsaturated linear polyester resin prepared by reacting a polyhydric alcohol and an alpha, beta-ethylenically unsaturated dicarboxylic acid wherein the percentages of each of (D), (E) and (F) is based on the total weight of (A), (B) and (C).

7. A process for preparing a copolymer composition which comprises polymerizing at a temperature between 100° C. and 175° C. (A) from 75% to 94% by weight of a polymerizable compound having the formula:

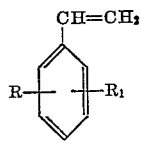

wherein R and R₁ are substituents selected from the group consisting of hydrogen and methyl and ethyl radicals, (B) from 5% to 20% by weight of a styrene-butadiene copolymer elastomer, (C) from 1% to 15% by weight of a non-conjugated bivinyl polymerizable cross-linking agent, (D) from about 0.1% to 5% by weight of a peroxide polymerization catalyst and (E) from about 0.005% to about 0.5% by weight of a catalyst promoter selected from the group consisting of (i) a compound selected from the group consisting of isomelamines, amidines and salts thereof, (ii) a quaternary ammonium salt of a non-oxidizing acid at least as strong as acetic acid and (iii) mixtures of member selected from the group consisting of (i) and (ii) with a copper salt containing copper in amounts of from about 0.001 to about 10 parts by weight per million based on the total weight of the composition wherein the percentages of each of (D) and (E) is based on the total weight of (A), (B) and (C).

8. A process for preparing a copolymer composition which comprises polymerizing at a temperature between 100° C. and 175° C. (A) from 75% to 94% by weight of a polymerizable compound having the formula:

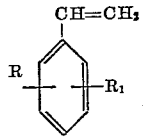

wherein R and R₁ are substituents selected from the group consisting of hydrogen and methyl and ethyl radicals, (B) from 5% to 20% by weight of a styrene-butadiene copolymer elastomer, (C) from 1% to 15% by weight of a non-conjugated bivinyl polymerizable cross-linking agent, (D) from about 0.1% to 5% by weight of a peroxide polymerization catalyst and (E) from about 0.005% to about 0.5% by weight of a catalyst promoter selected from the group consisting of (i) a compound selected from the group consisting of isomelamines, amidines and salts thereof, (ii) a quaternary ammonium salt of a non-oxidizing acid at least as strong as acetic acid and (iii) mixtures of member selected from the group consisting of (i) and (ii) with a copper salt containing copper in amounts of from about 0.001 to about 10 parts by weight per million based on the total weight of the composition and (F) from 1% to 10% by weight of an unsaturated linear polyester resin prepared by reacting a polyhydric alcohol and an alpha, beta-ethylenically unsaturated dicarboxylic acid wherein the percentages of each of (D), (E) and (F) is based on the total weight of (A), (B) and (C).

9. A process for preparing a copolymer composition which comprises polymerizing at a temperature between 100° C. and 175° C. (A) from 75% to 94% by weight of a polymerizable ring substituted methylstyrene, (B) from 5% to 20% by weight of a styrene-butadiene copolymer elastomer, (C) from 1% to 15% by weight of methylene bis acrylamide, (D) from about 0.1% to 5% by weight of a peroxide polymerization catalyst, (E) from about 0.005% to about 0.5% by weight of a catalyst promoter selected from the group consisting of (i) a compound selected from the group consisting of isomelamines, amidines, and salts thereof, (i) a quaternary ammonium salt of a non-oxidizing acid at least as strong as acetic acid and (iii) mixtures of a member selected from the group consisting of (i) and (ii) with a copper salt containing copper in amounts of from about 0.001 to about 10 parts by weight per million based on the total weight of the composition and (F) from 1% to 10% by weight of an unsaturated linear polyester resin prepared by reacting a polyhydric alcohol and an alpha, beta-ethylenically unsaturated dicarboxylic acid wherein the percentages of each of (D), (E) and (F) is based on the total weight of (A), (B) and (C).

10. A polymerizable composition according to claim 1 in which said catalyst promoter is a guanidine.

11. A polymerizable composition according to claim 1 in which said catalyst promoter is a biguanide.

12. A polymerizable composition according to claim 1 in which said catalyst promoter is a guanylurea.

13. A polymerizable composition according to claim 1 in which said catalyst promoter is a pseudourea.

14. A polymerizable composition according to claim 1 in which said catalyst promoter is a pseudothiourea.

References Cited in the file of this patent

UNITED STATES PATENTS

| | | |
|---|---|---|
| 2,609,353 | Rubens et al. | Sept. 2, 1952 |
| 2,740,765 | Parker | Apr. 3, 1956 |
| 2,822,343 | Day et al. | Feb. 4, 1958 |
| 2,822,344 | Duhnkrack | Feb. 4, 1958 |

OTHER REFERENCES

A.P.C. Publication, Serial No. 202,011, April 20, 1943.

UNITED STATES PATENT OFFICE
CERTIFICATE OF CORRECTION

January 23, 1962

Patent No. 3,018,266

Lennart A. Lundberg

It is hereby certified that error appears in the above numbered patent requiring correction and that the said Letters Patent should read as corrected below.

Column 3, line 41, for "amidine" read -- amidino --; column 5, line 15, for "aids" read -- acids --.

Signed and sealed this 10th day of July 1962.

(SEAL)
Attest:

ERNEST W. SWIDER
Attesting Officer

DAVID L. LADD
Commissioner of Patents